United States Patent [19]

Saruwatari et al.

[11] Patent Number: 5,267,256
[45] Date of Patent: Nov. 30, 1993

[54] WAVELENGTH DIVISION MULTIPLEX TYPE MODE - LOCK LASER DEVICE

[75] Inventors: Masatoshi Saruwatari; Satoki Kawanishi; Hidehiko Takara, all of Kanagawa, Japan; John Schlager, Boulder, Colo.

[73] Assignee: Nippon Telegraph and Telephone Corporation, Tokyo, Japan

[21] Appl. No.: 943,832

[22] Filed: Sep. 14, 1992

[30] Foreign Application Priority Data

Sep. 13, 1991 [JP] Japan .................................. 3-235143

[51] Int. Cl.$^5$ .................................................. H01S 3/083
[52] U.S. Cl. .......................................... 372/94; 372/6; 372/8; 372/20; 372/98; 372/105
[58] Field of Search ..................... 372/6, 18, 20, 21, 26, 372/28, 32, 33, 93, 94, 98, 105, 106

[56] References Cited

U.S. PATENT DOCUMENTS

| | | | |
|---|---|---|---|
| 4,035,081 | 7/1977 | Sepp et al. | 372/29 |
| 4,314,210 | 2/1982 | Everett | 372/18 |
| 4,775,214 | 10/1988 | Johnson | 385/1 |
| 5,077,745 | 12/1991 | Aoshima et al. | 372/18 |
| 5,164,954 | 11/1992 | Su | 372/94 |

Primary Examiner—Frank Gonzalez
Attorney, Agent, or Firm—Cushman, Darby & Cushman

[57] ABSTRACT

A wavelength division multiplex type mode-lock laser device which simultaneously generates high-speed optical pulse trains for more than one wavelength. This device simultaneously generates high-speed optical pulse trains at two or more wavelengths. A ring resonator type mode-lock laser device or a Fabry-Perot type mode-lock laser device is modified so that it has an optical path difference providing structure which provides different refractive indices for the polarization directions which are at right angles at one another. This enables configuring a resonator corresponding to the optical path lengths formed according to the refractive indices and hetero-wave length optical path equalizing means to provide different refractive indices for different wavelengths.

14 Claims, 9 Drawing Sheets

WAVELENGTH DIVISION MULTIPLEX TYPE MODE - LOCK LASER DEVICE

DETAILED DESCRIPTION OF THE INVENTION

1. Field of the Invention

This invention relates to a wavelength division multiplex type mode-lock laser device which simultaneously generates high-speed optical pulse trains with more than one wavelength. The wavelength division multiplex type mode-lock laser device of this invention is applied to optical frequency multiplex transmission where a plurality of wavelengths are multiplexed for optical fiber transmission and a high-speed pulse laser device of wavelength division multiplex type used for measurement devices utilizing difference in wavelengths.

2. Description of the Related Art

A conventional wavelength division multiplex type laser device basically comprises an integration of a plurality of separate laser resonators. For example, a distribution feedback type laser diode (DFB LD) of an array type has been developed. A distribution feedback type laser diode, however, requires a change in pitch (number of grooves per unit length) of the diffraction grating for different oscillation wavelengths, which makes fabrication difficult and results in poor manufacturing yield. Laser diodes also have difficulty in oscillation wavelength control, which results in inevitable wavelength fluctuation. It is also difficult to couple the light output from a laser diode to optical fibers, and it is extremely difficult to provide effective coupling between an array containing more than one laser diode and an optical fiber. Further, although the laser diode can be directly modulated by input current, arrayed laser diodes are inevitably accompanied by crosstalk among channels.

On the other hand, a conventional mode-lock laser device has only one oscillation wavelength. There has been no device which simultaneously generates oscillation for more than one wavelength.

FIG. 13 shows the principle of operation of a conventional ring resonator type mode-lock laser. FIG. 13 is a block diagram showing the basic configuration of a conventional ring resonator type mode-lock laser; FIG. 14 is a diagram showing typical spectrum characteristics obtained from mode locking; and FIG. 15 is a diagram showing its (temporal-waveform) characteristics.

In FIG. 13, a light amplifying means 10 and a light modulator 30 which modulates the optical loss or phase with the specified frequency are coupled together into a ring shape with optical coupling means, optical fibers for example, $60_1$ to $60_5$ to form a ring resonator. Optical branching device 20 is coupled between an optical coupling means $60_1$ and another optical coupling means $60_2$ so that the optical pulse within the ring resonator can be output.

When representing the physical length and the refractive index of the media constituting the ring resonator by $h$ and $n$ respectively, the optical path length L of the ring resonator can be defined as $L = \Sigma\ h_i n_i$, that is the sum of the products of physical length hi multiplied by refractive index $n_i$, the optical path lengths.

For a ring resonator, as shown in FIG. 14, there exist multiple longitudinal modes with frequency intervals given by $f_r = c/L$ (where c is the velocity of light). Application of light modulation with modulating frequency $f_m = f_r$ with the light modulator 30 in the ring resonator causes mode-lock oscillation where all longitudinal modes at frequency intervals of $f_r$ have their phases aligned. This gives an optical pulse train with the repetition period of $1/f_r$ as shown in FIG. 15. The pulse width corresponds to the reciprocal of the oscillation spectral width defined by the envelope of multiple longitudinal mode spectra and the center of the spectral envelope is the central wavelength (frequency: $\nu 0$).

In other words, longitudinal mode oscillation in mode locking is the sideband spectra defined by Fourier transformation of the repetitive pulse train. An optical pulse train is formed by the whole spectra and it is not a simultaneous generation of optical pulse trains for multiple wavelengths. A harmonic mode-locking where operation is made at a frequency as integral multiple of fr can be implemented with a modulating frequency of $fm = k \cdot fr$ (where k is an integer not less than 1). However, this method just multiplies the repetitive frequency by k, and it does not change the pulse or spectral width.

A conventional laser device capable of simultaneously generating multiple wavelength optical pulse trains was complicated in configuration and it was difficult to provide efficient coupling with optical fibers and to control oscillation wavelength.

This invention is based on a new principle and has an object the provision of a wavelength division multiplex type mode-lock laser device for simultaneous generation of high-speed optical pulse trains with two or more wavelengths which enables simple configuration and easy coupling with optical fibers and oscillation wavelength control.

SUMMARY OF THE INVENTION

The present invention uses a wavelength division multiplex type mode-lock laser device comprising a ring resonator type mode-lock laser device which has a light modulating means to modulate the input optical signal in amplitude or in phase with a specified frequency (fr, k·fr), a light amplifying means to amplify the output optical signal of the modulating means, an optical branching means to output the optical signal, and an optical coupling means which optically couples all of the above means to form a ring resonator having a ring-shaped optical path of a specified length. The ring resonator is provided with an optical path difference providing means which provides different refractive indices for polarization directions orthogonal to each other to configure a resonator corresponding to the optical path length formed according to the refractive indices and a hetero-wavelength optical path equalizing means to provide different refractive indices for different wavelengths.

Another aspect of this invention is a wavelength division multiplex type mode-lock laser device comprising a Fabry-Perot type mode-lock laser device which has a light modulating means to modulate the input optical signal in amplitude or in phase with a specified frequency (fr, k·fr), a light amplifying means to amplify the output optical signal of the modulating means, two light reflecting means to reflect most of the incident light, an optical coupling means provided with said two light reflecting means at both ends and having said light modulating means and said optical amplifying means disposed between the two reflecting means and optically coupled, which forms a Fabry-Perot type resonator having a round optical path of specified length, characterized by that said Fabry-Perot resonator is provided with an optical path difference providing means which provides different refractive indices for polarization directions orthogonal to each other to configure a resonator corresponding to the optical path length formed according to the refractive indices and a hetero-wavelength optical path equalizing means to provide different refractive indices for different wavelengths.

In this invention, a numerical relation $$L_1(\lambda_1)=L_2(\lambda_2)=\ldots=L_m(\lambda_m)$$

which is a condition that optical path lengths for different wavelength may be equalized by said hetero-wavelength optical path equalizing means, where $L_1-L_q$ (q is an integer more than one) are optical path lengths formed according to the refractive index, $\lambda_1 \sim \lambda_m$ (where m is an integer more than one but not more than q) are wavelengths falling within the gain spectral width of the light amplifying means, and $L_i(\lambda_j)$ is the optical length i for the wavelength $\lambda_j$.

In this invention, m resonators which satisfy the interrelation $$L_1(\lambda_1)=L_2(\lambda_2)=\ldots=L_m(\lambda_m)$$

may have equivalent configurations and may have a resonator gain of more than unity, the resonator gain being the difference between the gain of the light amplifying means for corresponding optical path length and loss of each resonator.

The wavelength $\lambda_1 \sim \lambda_m$ satisfying the interrelation $$L_1(\lambda_1)=L_2(\lambda_2)=\ldots=L_m(\lambda_m)$$

may have larger wavelength differences among them than the spectral width of the optical pulse which is generated from the resonator.

The optical path difference providing means may accommodate at least one birefringent medium having a birefringent optical fiber or birefringent crystal.

The optical path difference providing means may have an optical branching means branching into plural paths, plural wave-guides, which are connected to the plural paths and which have different optical path length respectively, and an optical coupling means which couples the optical signal traveled through the plural paths.

The optical path difference providing means accommodates N birefringent media made of birefringent optical fiber or birefringent crystal and $(N-p)$ birefringent media (where p is an integer from 1 to $(N-1)$ among them may be arranged so that their optical axes are in the same direction or orthogonal to each other, and the remaining p birefringent media are arranged so that their optic axes make a 45° angle with the optical axes of $(N-p)$ birefringent medium.

The optical path difference providing means may also accommodate at least one of the birefringent media contained in the light amplifying means, hetero-wavelength optical path equalizing means or optical coupling means.

The hetero-wavelength optical path equalizing means may be a single mode optical fiber, which shows zero dispersion at a certain wavelength and contains at least a part of the media having the wavelength dispersion characteristic included in the optical coupling means, light amplifying means, optical branching means or optical path difference providing means.

The hetero-wavelength optical path equalizing means may also be a single mode optical fiber, which shows zero dispersion at a certain wavelength and contains at least a part of the media having the wavelength dispersion characteristic contained in the optical coupling means, light amplifying means or optical path difference providing means.

A wavelength division multiplex type mode-lock laser device of this invention has an optical path difference providing means e.g., a birefringent medium, inserted into a ring resonator or a Fabry-Perot resonator which forms different optical path lengths for the same wavelength, and a hetero-wavelength optical path equalizing means inserted into these resonators makes the optical path lengths the same for different wavelengths due to its wavelength dispersion. Accordingly, a plurality of different wavelengths can satisfy the resonance frequency conditions for mode locking, and simultaneous oscillation for more than one wavelength can be obtained by physically one mode-lock laser.

When using a plurality of birefringent media for the optical path difference providing means, the optical axes at some of the birefringent media is disposed at 45° relative to the optical axis direction of other birefringent media to form a resonator with three or more optic path lengths, which enables multiple wavelength oscillation.

The optical path difference providing means may be a single birefringent medium inserted into the resonator or may be birefringent media contained in the light amplifying means, hetero-wavelength optical path equalizing means or optical coupling means.

A hetero-wavelength optical path equalizing means may be a medium with wavelength dispersion characteristics such as a single mode optical fiber inserted into the resonator as a centralized functional component or may be of distributed configuration by utilizing a media with wavelength dispersion characteristics contained in optical coupling means, light amplifying means or optical path difference providing means.

DESCRIPTION OF THE EMBODIMENTS

Figure 1:
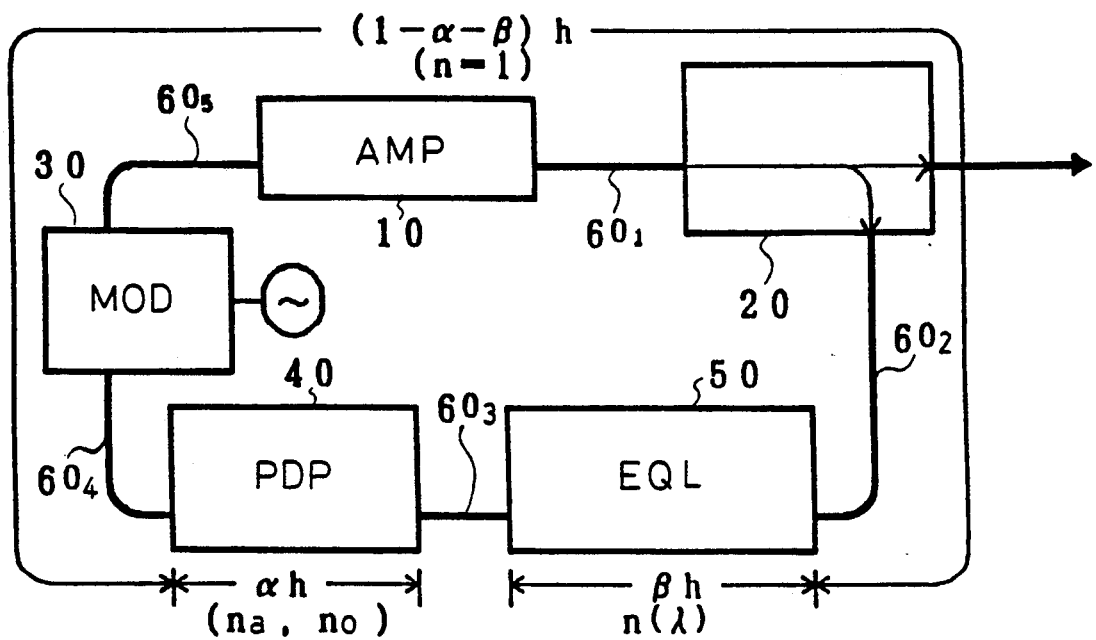
FIG. 1 shows a block diagram showing an embodied configuration of a wavelength division multiplex type mode-lock laser device of a first embodiment.

FIG. 1 is a block diagram showing an embodied configuration of a wavelength division multiplex type mode-lock laser device according to the first embodiment. This embodiment represents an application of the invention to a ring resonator type mode-lock laser.

A light amplifier 10, a light modulator 30, an optical path difference providing means 40 and a hetero-wavelength optical path equalizing means 50 are optically coupled together into a ring shape by optical coupling means $60_1$ to $60_5$. For example, the optical coupling means can be space or waveguide such as optical fiber, to form a ring resonator having predetermined optical path lengths. FIG. 1 shows an optical branching device 20 inserted at a first location between the optical coupling means $60_1$, a first optical signal, or another optical coupling means $60_2$ which outputs a first optical signal, a clockwise optical pulse, from the ring resonator. Alternately, the optical branching device 20 may be inserted on the opposite side of the light amplifying means 10 for counterclockwise optical pulses. The arrangement of the components configuring the ring resonator is not limited to the one described in this embodiment.

Figure 12:
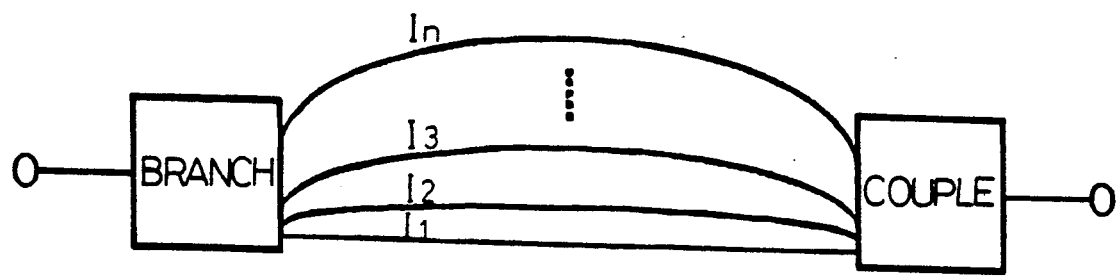
FIG. 12 shows an example of an optical path different providing means.
Figure 13:
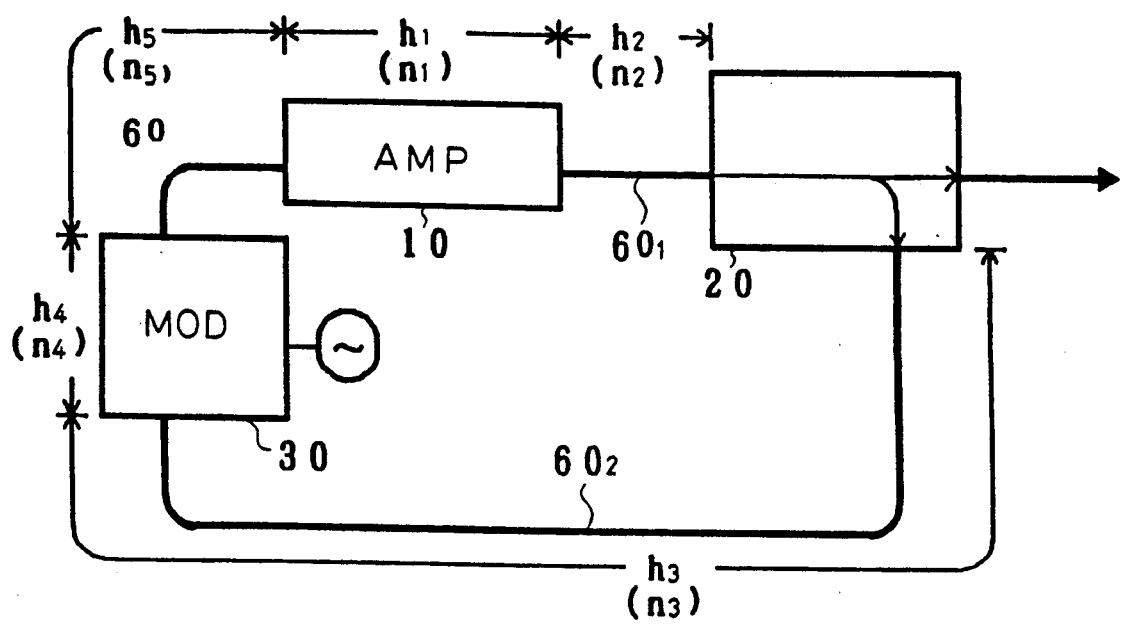
FIG. 13 shows a view to explain the operation principle of a conventional ring resonator type mode-lock laser.
Figure 14:
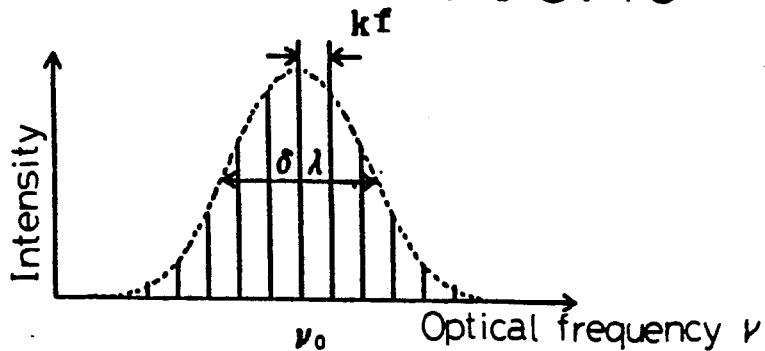
FIG. 14 is a diagram showing typical spectrum characteristics obtained from mode locking.
Figure 15:
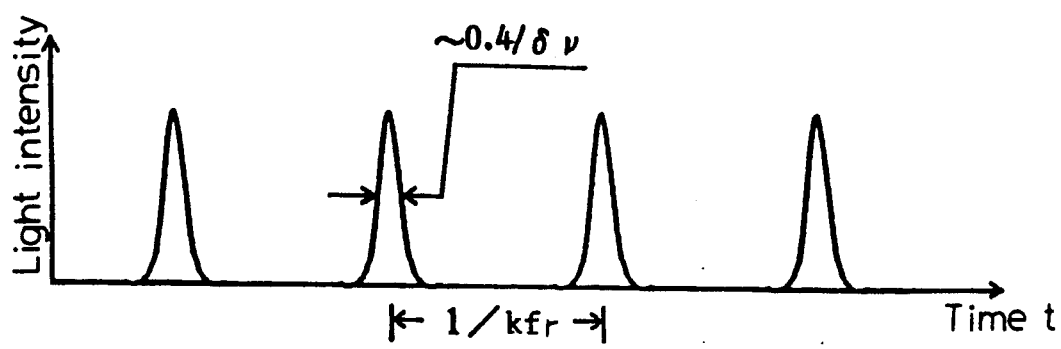
FIG. 15 is a diagram showing the temporal waveform characteristics.

This embodiment has an optical path difference providing means 40 and a wavelength dispersing hetero-wavelength optical path equalizing means 50 mounted inside the ring resonator in addition to the conventional components of a ring resonator type mode-lock laser such as shown in FIG. 12. The optical path difference providing means 40 is birefringent and provides different refractive indices depending on polarization directions (TE and TM depolarizations, at right angles to each other). The hetero-wavelength optical path equalizing means 50 provides different refractive indices for different wavelengths. They are included in this embodiment for equivalent concentration of the optical fibers and dielectric materials with refractive indices of other than one used in the light amplifying means 10, optical branching device 20 and optical coupling means $60_1$ to $60_5$, so that explanation can be made easier by handling their refractive index as 1. Assuming that the length of the whole ring resonator is h, the refractive indices of the optical path difference providing means 40 having a birefringent characteristic and a length of $\alpha$ h to extraordinary and ordinary rays are $n_e(\lambda)$ and $n_o(\lambda)$ respectively ($n_e(\lambda) > n_o(\lambda)$), and the refractive index of the hetero-wavelength optical path equalizing means 50 having a length of $\beta h$ is $n(\lambda)$. Ignoring the length of the optical coupling means $60_3$, then the refractive index of the part other than the optical path difference providing means 40 and the hetero-wavelength optical and path equalizing means 50 (length: $(1-\alpha-\beta)h$) can be treated as 1.

Figure 2A:
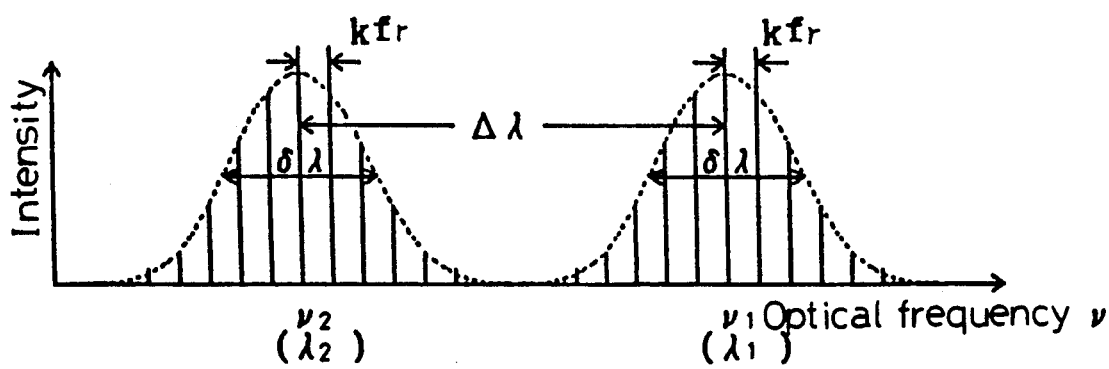
FIGS. 2(a) and 2(b) are diagrams to explain the operation principle of a wavelength division multiplex type mode-lock laser device of a second embodiment.
Figure 2B:
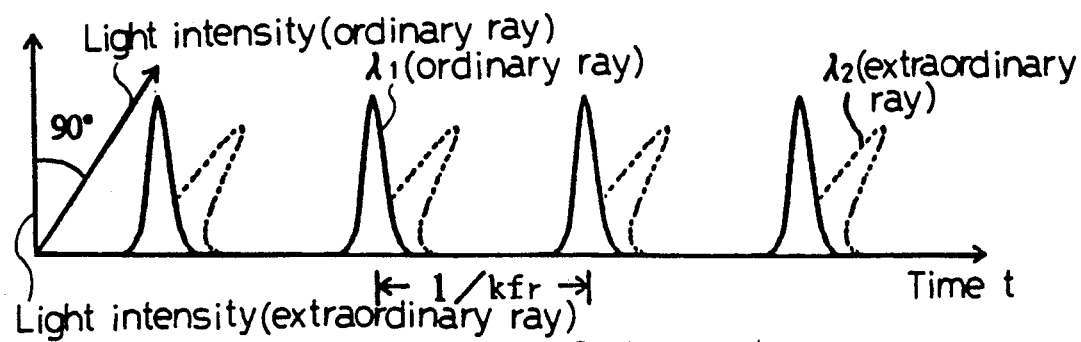

The operation principle of a ring resonator type mode-lock laser of this embodiment is described with reference to FIGS. 1, 2(a) and 2(b). FIG. 2(a) is a diagram showing typical spectrum characteristics obtained by mode-locking and FIG. 2(b) is a diagram showing its time-waveform characteristics. These figures take a mode-lock laser for two-wavelength oscillation as an example.

In the configuration of FIG. 1, even if the ring resonator is physically one unit, it actually has two optical path lengths because of the difference in refractive indices depending on polarization direction (birefringence). The optical path lengths $L_e$ and $L_o$ for extraordinary and ordinary rays, respectively, are expressed as follows:

$$L_e(\lambda) = \{\alpha n_e(\lambda) + \beta n(\lambda) + (1-\alpha-\beta)\} h \quad (1)$$

$$L_o(\lambda) = \{\alpha n_o(\lambda) + \beta n(\lambda) + (1-\alpha-\beta)\} h \quad (2)$$

If the modulation frequency $f_m$ for mode-locking matches the longitudinal mode interval determined by the ordinary ray (the values multiplied by integer k), then $$f_m = \{c/L_o(\lambda_1)\} \times k = kfr \quad (3)$$

where $\lambda_1$ is a wavelength within the scope of the gain spectrum of the light amplifier 10. In this case, ordinary ray causes the mode-lock oscillation with a wavelength of $\lambda_1$.

For an extraordinary ray, on the other hand, the condition $n_e(\lambda) > n_o(\lambda)$ results in $L_e(\lambda_1) > L_o(\lambda_1)$ and the wavelength $\lambda_1$ does not satisfy the resonance condition (3) and the mode-lock oscillation cannot be obtained. However, both extraordinary and ordinary rays have the wavelength dispersion characteristics and even an extraordinary ray can satisfy the resonance condition by taking an appropriate wavelength $\lambda_2$. For this, the following condition is required:

$$L_e(\lambda_2) > L_o(\lambda_1) \quad (4)$$

Substituting (1) and (2) and (4), $$\alpha n_e(\lambda_2) + \beta n(\lambda_2) = \alpha n_o(\lambda_1) + \beta n(\lambda_1) \quad (5)$$

This condition can be simply put into:

$$\alpha B(\lambda_1) = -(\alpha + \beta)(\partial n/\partial \lambda)\Delta\lambda \quad (6)$$

where wavelength difference $\Delta\lambda = \lambda_2 - \lambda_1$; birefringence $B = n_e - n_o$ and refractive index $n_e$ of extraordinary ray and the refractive index n of the hetero-wavelength optical path equalizing means 50 are assumed to have almost the same differential calculus for the wavelength.

The condition $\partial n/\partial \lambda < 0$ applies to ordinary substances. When $B > 0$, the equation (6) is satisfied by a wavelength $\lambda_2$, which is larger than $\lambda_1$ and its value is determined by $\alpha$, $\beta$, B and $\partial n/\partial \lambda$. By selecting parameters so that the wavelength $\lambda_2$ falls within the gain spectrum of the light amplifying means 10, mode-lock oscillation for the wavelength $\lambda_2$ can be obtained even for an extraordinary ray. Thus, the configuration of this embodiment is, as shown in FIG. 2(a), capable of generating mode-lock pulse trains with the same repetition frequency with two individual wavelengths. Light modulation with $f_m = kf_r$ at the light modulator 30 in the ring resonator causes the mode-lock oscillation with all of its longitudinal modes having frequency intervals of $k \cdot f_r$ aligned for phase, and results in optical pulse trains with a repetition period of $1/kf_r$ as shown in FIG. 2(b).

The two optical pulse trains are orthogonally polarized lights in FIG. 2(b), but they can be made into parallel polarized light by adopting the configuration of FIG. 11 described later. Here, $n_e(\lambda) > n_o(\lambda)$ is assumed in the above description, but (6) can be also satisfied even if the inequality has the opposite direction. This means that multiple wavelength oscillations can be generally realized.

In addition, the wavelength difference $\Delta\lambda$ between the two optical pulses is preferably larger than the spectral width $\partial \lambda$ (substantially inversely proportional to the pulse width) of the mode-lock pulse, as shown in FIG. 2(a). This is because the oscillation may become unstable due to mode pulling by the other optical frequency if two oscillation spectra overlap. Further, the gain $G(>1)$ of the ring resonator is preferably selected so that it is almost the same for both of the two wavelengths. Particularly, if an amplifying medium with nonhomogeneous gain is used, each of the wavelengths will oscillate broadening characteristics independently, which results in effective operation. An example of such a medium is an optical fiber with doping of erbium or other rare earth elements, which is described later as an embodiment of the light amplifying means 10.

Now an embodiment using polarization maintaining PANDA optical fiber (a birefringent substance) and an ordinary optical fiber as an optical path difference providing means 40 and a hetero-wavelength optical path equalizing means 50 respectively is described. In this case, birefringence B is about $3 \times 10^{-4}$ and the wavelength dispersion $\partial n/\partial \lambda$ is $-1.2 \times 10^{-5}$ (nm$^{-1}$). If $\alpha = 0.05$ and components of a ring resonator including light amplifying means 10 are mostly optical fibers ($\beta = 0.9$), the wavelength difference $\Delta\lambda$ between the two optical pulses is:

$$\Delta\lambda = \alpha B(\lambda_1)/\{-(\alpha + \beta)(\partial n/\partial \lambda)\} \quad (7)$$
$$= 0.05 \times 3 \times 10^{-4}/(0.95 \times 1.2 \times 10^{-5})$$
$$= 1.32 \text{ (nm)}$$

In other words, a ring resonator using optical fibers can generate mode-lock oscillation for two wavelengths with a difference of about 1.3 nm by using a polarization preserving PANDA optical fiber having a length corresponding to 5% of the total length as the optical path difference providing means 50. Actually, with a ring resonator type mode-lock laser device using optical fibers with erbium doping as described later, an optical pulse train with two wavelengths can be obtained for the wavelength difference of about 0.06 nm to 1.7 nm by changing $\alpha$ in the range of 0.02 to 0.06.

The explanation given above was based on the value k being the same for each wavelength as defined in Eq (3). However, the value k can be different on each wavelength, and in such a case mode synchronization can be realized. When modulating frequencies of two different wavelengths as $f_{m1}{}^*$, $f_{m2}{}^*$, frequency separation of the virtual modes (including harmonics) for two wavelengths should be equal to $f_{m1}$ and $f_{m2}$ respectively, namely, $$f_{m1} = \{c/Le\} \times k_1 \quad (8)$$

$$f_{m2} = \{c/Le\} \times k_2 \quad (9)$$

where c is speed of light in a vacuum; and $k_1$, $k_2$ are integers greater than unity. As is explained above, $f_{m1} \cdot f_{m2} (= f_m)$ when mode synchronizing oscillation is conducted on two wavelengths $\lambda_1$ and $\lambda_2$. That is:

$$f_m = [c/\{\alpha n_e(\lambda_2) + \beta n(\lambda_2) + 1 - \alpha - \beta\}h] \times k_1 \quad (10)$$
$$= [c/\{\alpha n_o(\lambda_1) + \beta n(\lambda_1) + 1 - \alpha - \beta\}h] \times k_2$$

is attained from Eqs (1), (2) and Eqs (8), (9). From Eq. (10), the relation between $n(\lambda_1)$ and $(\lambda_2)$ are $$\{\alpha n_e(\lambda_2) + \beta n(\lambda_2) + 1 - \alpha - \beta\} h]/\{\alpha n_o(\lambda_1)\lambda\beta n (\lambda_1) + 1 - \alpha - \beta\} h] = k_1/k_2 \quad (11)$$

Hence, $$\Delta\lambda = -1/\{(\alpha+\beta) \partial n(\lambda_1)/\partial\lambda\} \times [\alpha B (\lambda_1) + (k_1/k_2 - 1) \{\alpha n_o(\lambda_1) + \beta n(\lambda_1) - (1-\alpha-\beta)\}] \quad (12)$$

And the Eq (12) can be rewritten, when $$\alpha + \beta = 1, n_0(\lambda_1) = n(\lambda_1), \text{ as } \Delta\lambda = -1/(\alpha+\beta) \partial n(\lambda_1)/\partial\lambda\} \times [\alpha B (\lambda_1) + (k_1/k_2 - 1) n (\lambda_1)] \quad (13)$$

where $\alpha$, B are values of about $1.5 \times 10^{-5}$, and $(k_1/k_2 - 1)$ can be selected as comparable to $\alpha B$, difference of wavelength as above is realized. For example, $k_1 = 100001$, $k_2 = 100000$, and $\Delta\lambda = 2.2$ (nm).

Instead of a polarization preserving PANDA optical fiber serving as the optical path difference providing means 40, crystals, calcite or their birefringent crystals may be used. Since they have larger birefringence B (about $8.5 \times 10^{-3}$ for crystal and 0.157 for calcite), their length can be reduced to about 1/28 or 1/520 of that for the polarization preserving PANDA optical fiber. For example, if $\alpha = 0.05$ for equation (7) and the length of the whole ring resonator is 10 m, the polarization preserving PANDA optical fiber will be about 50 cm, but crystal needs about 1.8 cm and calcite requires about 1 mm for the same operation.

Figure 3:
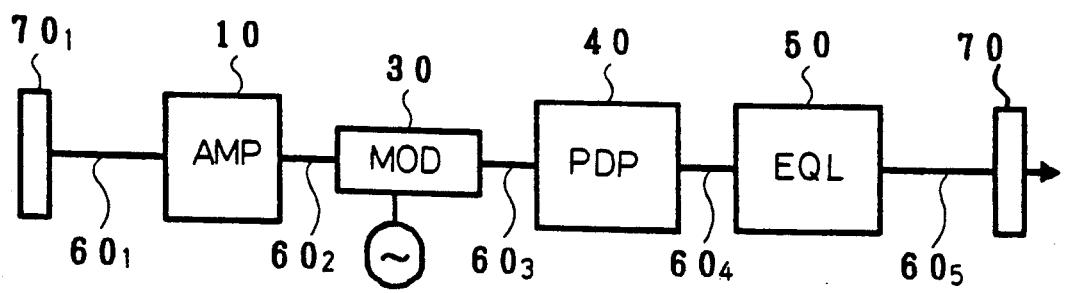
FIG. 3 shows a block diagram showing an embodied configuration of a wavelength division multiplex type mode-lock laser device of the second embodiment.

FIG. 3 is a block diagram showing an embodied configuration of a wavelength division multiplex type mode-lock laser device. This embodiment represents an application of the invention to a Fabry-Perot type mode-lock laser.

FIG. 3 shows a light amplifying means 10, a light modulator 30, an optical path difference providing means 40 and a hetero-wavelength optical path equalizing means 50. A pair of light reflectors 70, and 70$_5$ provided at both ends connected optically in series of the series connection. The above elements are optically coupled together with optical coupling means 60$_1$ to 60$_5$ (space or waveguide such as optical fiber, for example) to form a Fabry-Perot resonator having a predetermined optical path length. This figure shows a configuration where the optical pulse within the Fabry-Perot resonator is output through the reflector 70$_2$. The arrangement of the components forming the Fabry-Perot resonator is not limited to the one given in this embodiment except for the reflectors 70$_1$ and 70$_2$.

This embodiment is characterized by a configuration where an optical path difference providing means 40 and a hetero-wavelength optical path equalizing means 50 are mounted inside the Fabry-Perot resonator in addition to the conventional components of the Fabry-Perot type mode-lock laser.

The operation principle of this embodiment can be explained in the same way as the above description for a ring resonator type mode-lock laser, except that the frequency interval of the longitudinal mode is $f_r = c/2L$, that is, half of the interval in the above case. In short, mode-lock oscillation can be generated simultaneously for two wavelengths satisfying the equation (6).

Figure 4:
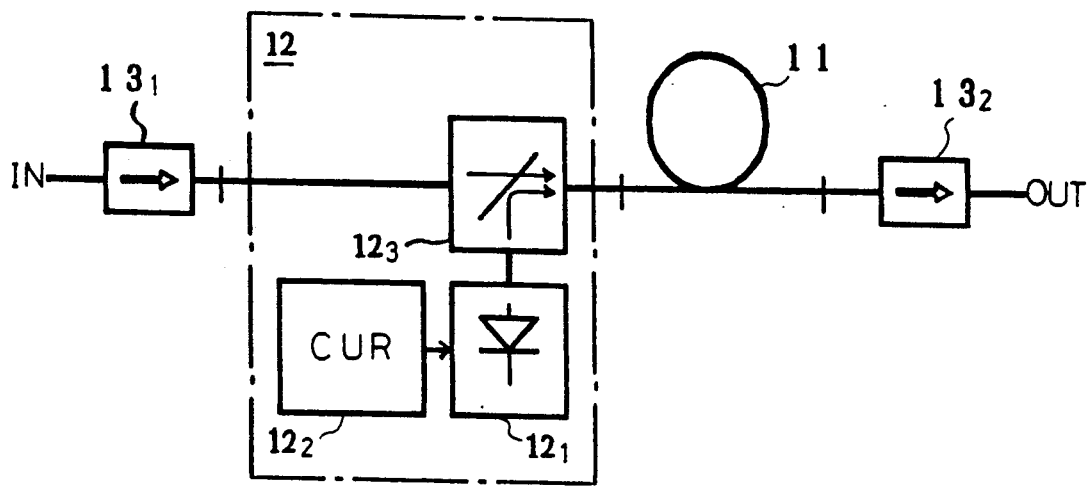
FIG. 4 shows a block diagram to show an embodied configuration of a light amplifying means 10.
Figure 5:
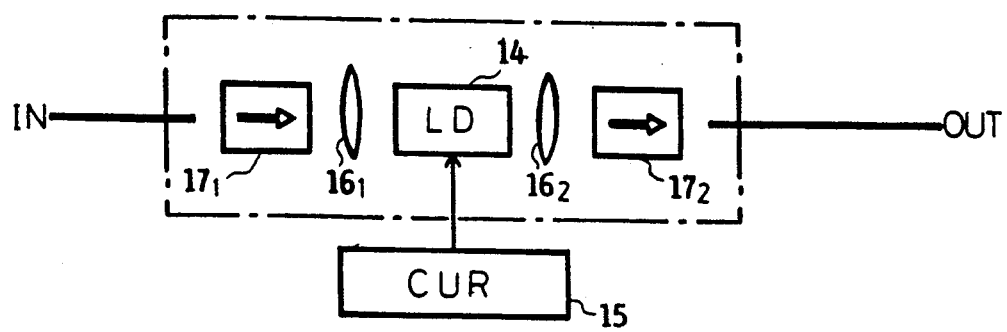
FIG. 5 shows a block diagram to show another embodied configuration of a light amplifying means 10.
Figure 6:
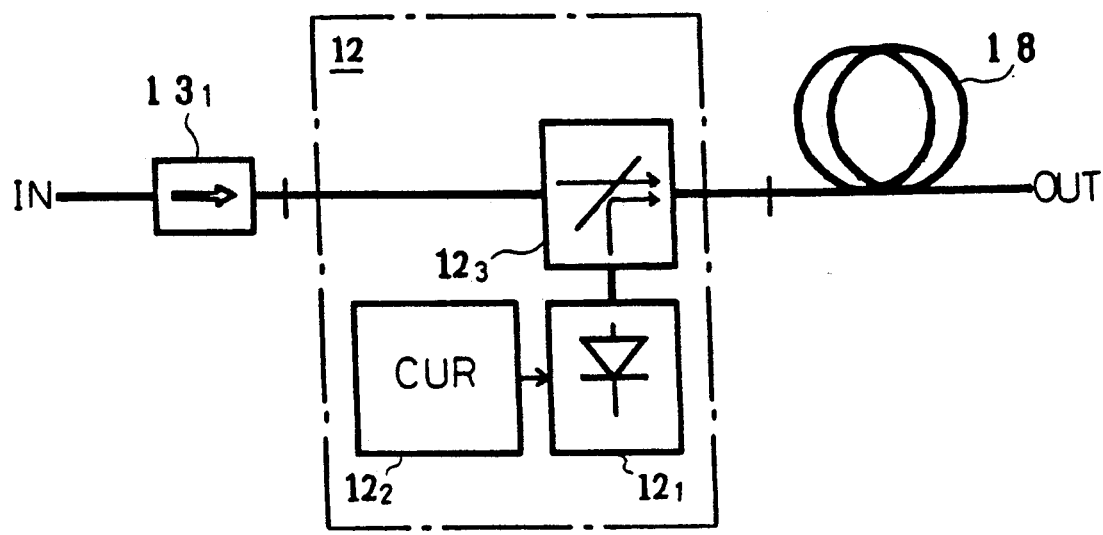
FIG. 6 shows a block diagram to show still another embodied configuration of a light amplifying means 10.

FIGS. 4, 5 and 6 show an embodiment of the light amplifying means 10 used in the ring resonator type mode-lock laser shown in FIG. 1 are described.

FIG. 4 shows the embodiment of a light amplifying means using a rare-earth-doped fiber. It has a rare-earth-doped optical fiber 11, pumping light supplier 12 to supply pumping light to this rare-earth-doped optical fiber 11 and optical isolators $13_1$ and $13_2$ with optical fibers mounted at both ends. The pumping light supplier 12 comprises a semiconductor light source $12_1$ to generate pumping light, current source $12_2$ to supply current to the semiconductor light source $12_1$, and a two-to-one wavelength division multiplex coupler $12_3$ to join the pumping light and the oscillation light from the resonator and lead them to the rare-earth-doped optical fiber 11.

All of these components can be coupled with optical fibers. Because of the directional, characteristics of the optical isolators, an optical path is established for one direction only: from the left end (IN) to the right end (OUT) in relation to the oscillation light. For connection of optical fibers, super PC optical connectors with extremely low reflected light, other optical connectors with oblique end faces or fusion splicing are recommended. Optical isolators $13_1$ and $13_2$ may be either of polarization independent type or polarization dependent type (which transmits only the linearly polarized light). When the reflection level within the optical path is low, one of the optical isolators can be omitted.

In this embodiment, the pumping light supplier 12 is positioned for a forward pumping configuration where the pumping light is injected in the same direction as the passing of oscillation light. This can be arranged in the same way even if the pumping light supplier 12 is located on the left side of the optical isolator $13_1$. The pumping light supplier 12 may be also positioned on the right of the rare-earth-doped optical fiber 11 for backward pumping configuration where the pumping light is injected in the direction opposite to the passing of the oscillation light. Further, configurations with both forward and backward pumping lights can be adopted to improve the pumping power. It is also possible to connect more than one amplifier using rare-earth-doped optical fiber in series to improve gain or output power.

When the rare-earth-doped optical fiber 11 is relatively long, it can serve as a part of the hetero-wavelength optical path equalizing means 50 shown in FIG. 1. If the rare-earth-doped optical fiber 11 is of polarization preserving type, it can serve as a part or whole of the optical path difference providing means 40.

An embodiment of a rare-earth-doped optical fiber 11 is a silica-based optical fiber having a length of several meters to 100 meters with erbium doping. Its gain bandwidth may be broadened by additionally doping aluminum. Such an erbium-doped optical fiber has a gain within the wavelength range of 1.53 to 1.56 $\mu m$ and it can cause simultaneous oscillation of more than one wavelength light within this wavelength band. The wavelengths suitable for optical pumping of erbium ions are 1.46 to 1.49 $\mu m$ or 0.97 to 0.99 $\mu m$. A laser diode to generate the light of these wavelengths has been already developed. If an optical fiber with doping of rare earth elements other than erbium e.g., Neodymium (Nd) or praseodymium (Pr), for example is used, light having a wavelength of 1.3 $\mu m$ or other wavelength can be oscillated by optical pumping of other wavelengths.

The light amplifying means shown in FIG. 5 is an embodiment having a laser diode (LD) amplifier module of the travelling wave (TW) type provided with optical fibers on both sides. It has a laser diode chip 14, a current source 15 to supply electrical current to the laser diode chip 14, a pair of lens couplers $16_1$ and $16_2$ for optical coupling between laser diode chip 14 and optical fibers, and a pair of optical isolators $17_1$ and $17_2$ inserted between the lens couplers $16_1$ and $16_2$ and optical fibers. The laser diode chip 14 has its reflectance at the both end faces practically reduced to zero by means of anti-reflection film coating on the both end faces, oblique end faces or end face window structure. In such a configuration, the current source 15 can serve as a light modulator 30 shown in FIGS. 1 and 3 by using direct modulation.

The optical isolators $17_1$ and $17_2$ may have the fiber pigtailed structure as shown in FIG. 4. The lens coupler $16_1$ or $16_2$ is not limited to a lens system with one lens but can be embodied as a confocal lens system combining two or more lenses with different focal lengths or a quasi-confocal lens system or tapered hemispherical-end optical fiber. It is necessary, however, to suppress the reflected light from the end faces of the laser diode chip 14, lens couplers $16_1$ or $16_2$, optical isolators $17_1$ and $17_2$ and end faces of optical fibers. Adoption of oblique end faces and anti-reflection film coating will be effective.

A light amplifying means shown in FIG. 6 is an embodiment as an optical fiber Raman amplifier. It consists of an optical fiber Raman amplifying unit 18, an pumping light supplier 12 to supply pumping light to the optical Raman amplifier unit 18, and an optical isolator $13_1$ to determine the optical path in one direction. The pumping light supplier 12 is the same as the one shown in FIG. 4.

The wavelength of the pumping lights is set shorter than that of the oscillation light by the Raman shift amount (for silica based optical fiber, 1.47 $\mu m$ pumping light will be suitable for 1.55 $\mu m$ signal light). The optical fiber Raman amplifying unit 18 is embodied with an ordinary silica based optical fiber or a germanium doped optical fiber having improved gain per a unit length with high doping of germanium (Ge). Since the optical fiber Raman amplifying unit 18 uses a relatively long optical fiber, it can also serve as a part of the hetero-wavelength optical path equalizing means. If optical pumping by two orthogonally polarized lights is applied to the optical pumping by two orthogonally polarized lights is applied to the optical fiber Raman amplifying unit 18 of a polarization maintaining type, the unit can serve as a part or the whole of the optical path difference providing means 40.

The two-to-one wavelength division multiplex coupler $12_3$ shown in FIGS. 4 and 6 can comprise an optical filter made of a multilayered dielectric film, optical fiber couplers made by fusion and elongation on the sides of two single-mode optical fibers, diffraction gratings or other elements, since a large wavelength difference of 50 nm or more is used for the signal and pumping light. In particular, optical fiber couplers cause less internal reflection than other means because they can couple two light beams that are confined in optical fibers.

Next, an embodiment of light amplifying means 10 used in the Fabry-Perot type mode-lock laser shown in FIG. 3 is explained. A Fabry-Perot type mode-lock laser uses a light amplifying means with optical isolators omitted from the configurations shown in FIGS. 4 to 6, in order to ensure a round trip optical path. Other requirements are almost the same as those described above, but it is necessary to suppress the internal reflection as far as possible at the light modulator 30, optical coupling means $60_1$ and $60_5$, and optical path difference providing means 50 to reduce self-excited oscillation caused by unwanted reflection inside the Fabry-Perot type resonator. Accordingly, it is recommended to provide no vertical end face within the optical paths and to use a fusion slicing method for connection of optical fibers.

An embodiment of the light modulator 30 shown in FIGS. 1 and 3 is now described.

The light modulator 30 can be a Mach-Zehnder type LiNbO$_3$ light intensity modulator, a directional coupler, a type LiNbO$_3$ light intensity modulators or other similar devices utilizing electro-optical effect.

A light modulator utilizing the electro-optical effect of InGaAsP material with an MQW structure and its voltage dependency of the absorption edge can also be used. Many of these light modulators have polarization dependency, but this will not cause any problem if the incident polarization is in the same direction as the polarization direction in which the optical modulation is applied. When a polarization maintaining optical fiber is connected in the same direction as the above polarization direction, the incident light polarization can be aligned with the birefringent axis of the optical fiber. The modulating waveform applied to the light modulator 30 may be a sine wave if the frequency $f_m$ is high. If it is low, however, a rectangular wave is preferred.

Figure 7:
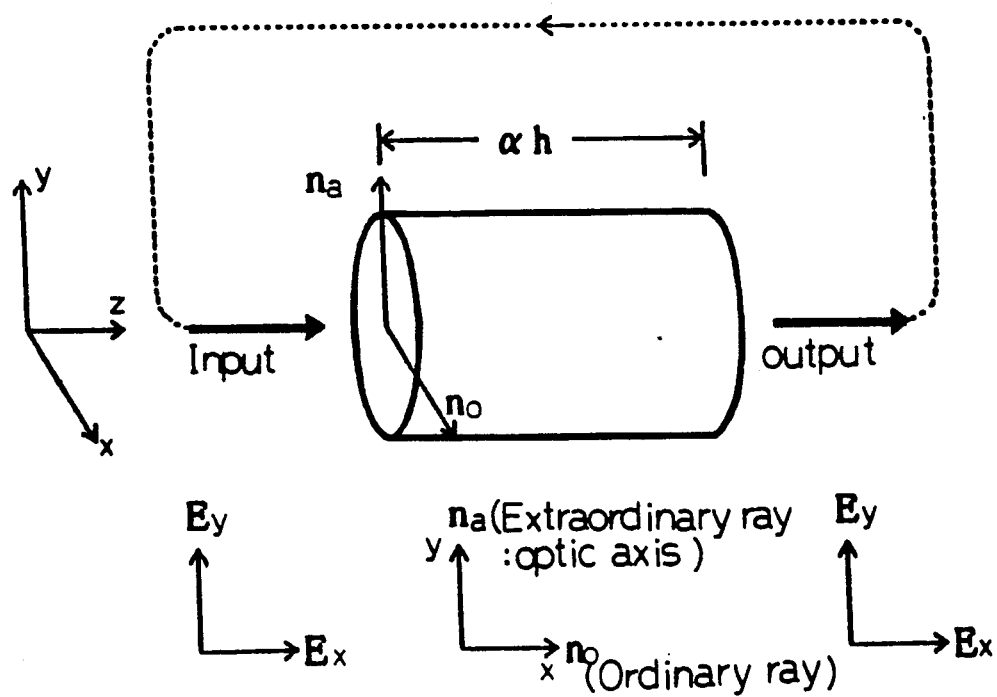
FIG. 7 shows a diagram showing the configuration principle of an optical path difference providing means 40 to provide two optical path differences.

FIG. 7 shows the principle configuration and conditions to provide two optical path differences with the optical path difference providing means 40 shown in FIGS. 1 and 3.

The optical path difference providing means 40 is configured by one birefringent medium having a length of $\alpha$ h and a birefringence B of $n_e - n_o$. For example, as shown in the figure, when the y axis is the direction of the optical axis (polarization direction of extraordinary ray having a refractive index of $n_e$), the optical path length becomes $\alpha h n_e$ for passing of y polarization light $E_y$, and $\alpha h n_o$ for x polarization light $E_x$. The optical path difference between two polarization lights is $\alpha hB$. In other words, the optical path difference of a resonator is generated between x and y polarizations. Accordingly, to configure a resonator with two kinds of optical paths, both polarizations need to be input to the birefringent medium with the same intensity, and output with their polarization directions unchanged and input again. Suitable birefringent media include quartz and calcite as well as polarization preserving PANDA optical fiber, as mentioned above.

Figure 8:
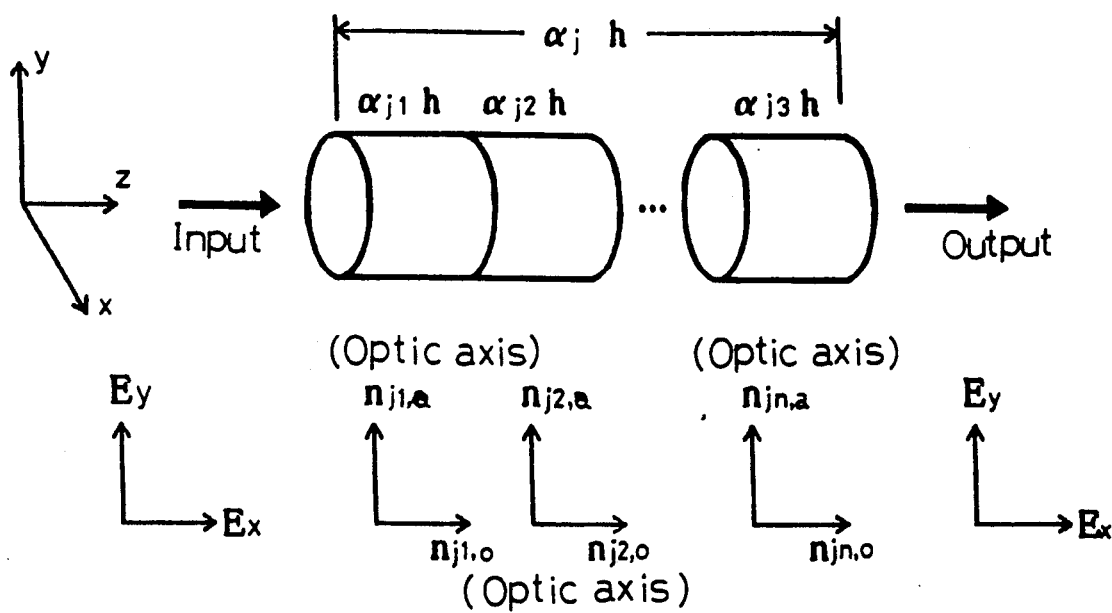
FIG. 8 shows a diagram showing the configuration principle of an optical path difference providing means 40 to provide two optical path differences.

FIG. 8 shows that even if the optical path difference providing means 40 consists of two or more birefringent media (having lengths of $\alpha_{j1}h$, $\alpha_{j2}h$, ..., $\alpha_{jn}h$ and birefringence of $B_{j1}$, $B_{j2}$, ..., $B_{jn}$), they can be considered as one birefringent medium if the optic axis direction of the medium is parallel (making an angle of 0°) or orthogonal (making a right angle) to the first optic axis. Here, the equation (6) for wavelength determination is substituted with the following conditions: (for the left side):

$$\alpha B = \alpha_{j1} B_{j1} \pm \alpha_{j2} B_{j2} \pm \ldots \alpha_{jn} B_{jn} = \alpha_j B_{j,eff} \quad (14)$$

(for the right side):

$$\alpha = \alpha_j = \alpha_{j1} + \alpha_{j2} + \ldots + \alpha_{jn} \quad (15)$$

where the sign ± includes + for 0° and − for 90°.

From the above relation, the total length of the birefringent media equals the sum of the individual lengths but the equivalent birefringence $B_{j,eff}$ can vary within the range $0 < B_{j,eff} < B$ depending on the selected length ratio and optical axis direction (0° or 90°) even if the individual value B is always the same. In other words, for a given $\alpha$ (total length of birefringent media), birefringence can be any value not more than B and the wavelength difference can be freely set correspondingly.

FIG. 9 shows the principle configuration and conditions to provide three or more optical path differences with the optical path difference providing means 40.

Figure 9A:
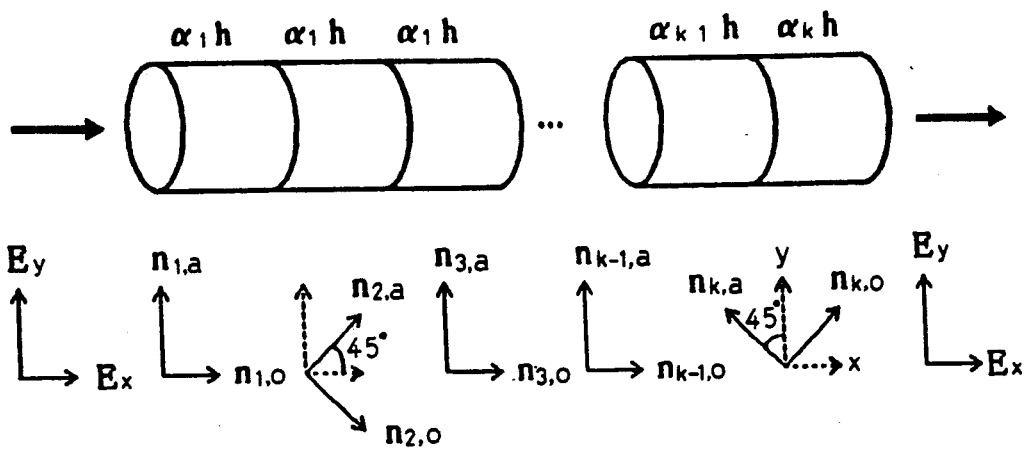
FIGS. 9(a) and 9(b) explain the configuration principle and operation of an optical path difference providing means 40 to provide three or more optical path differences.

The optical path difference means 40 has two or more basic units as shown in FIG. 9(a), a basic unit being a birefringent medium shown in FIGS. 7 and 8 (length: $\alpha_j h$; birefringence $B_{j,eff}$). The optic axis direction of the units are arranged so that each unit makes an angle of about ±45° with the adjacent unit. If the adjacent optic axes are parallel or orthogonal, they are treated as one unit as described in FIG. 8.

Four optical path differences can be obtained by two pairs of units in a two-stage configuration. Each unit must substantially satisfy the equation $\alpha_1 B_{1,eff} = 2\alpha_2 B_{2,eff}$. However, their order can be changed.

Figure 9B:
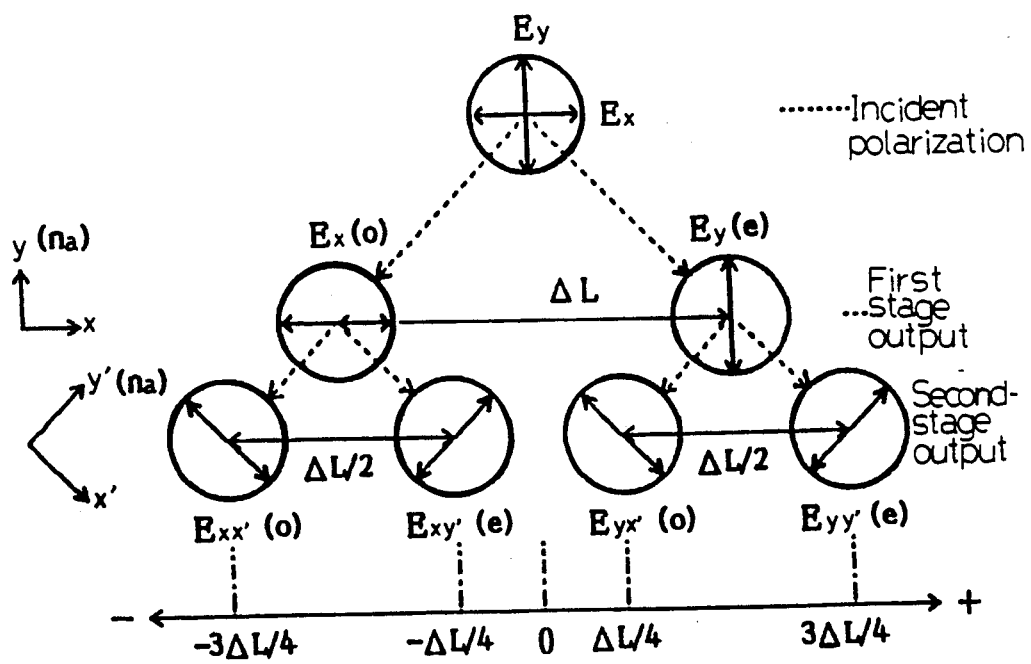

FIG. 9(b) is a schematic diagram to show how the optical path difference is caused depending on polarization direction. FIG. 9(b) shows the horizontal axis representing relative difference of optical path lengths. The optic axis of the first stage (principal axis) is now referred to as the y axis. When y polarization $E_y$ and x polarization $E_x$ are injected, the optical path length of y polarization $E_y$ becomes longer than that of the x polarization $E_x$ by $\Delta L$ ($= \alpha_1 h \beta_{1,eff}$) after they pass through the first stage. Since the y polarization $E_y$ or x polarization $E_x$ makes an angle of 45° or −45° with the second stage optic axis (y' axis), each of them is divided into y polarization component ($E_{yy'}$ and $E_{xy'}$) and x' polarization component ($E_{yx'}$ and $E_{xx'}$) which makes a right angle with the y' axis when they pass through the second stage. The difference in optical path length between y' polarization component and x' polarization component is $\Delta L/2$, and four components with an interval of optical path differences equivalent to $\Delta L/2$ are generated ($E_{xx'}$, $E_{xy'}$, $E_{yx'}$, and $E_{yy'}$) in the order from shorter to longer optical path lengths as shown in the figure. Utilizing this principle, $2^k$ kinds of optical path differences can be formed by using k stages.

A number of optical path differences other than $2^k$ can be realized by selecting the condition $\alpha_j h B_{j,eff}$ as described above referring to FIG. 9(b). For example, if $\alpha_1 B_{1,eff} = \alpha_2 B_{2,eff}$ then $E_{xx'}$ and $E_{yx'}$ become identical and three kinds of optical path differences can be obtained.

With birefringent substances configured as above, individual polarizations divided into TE and TM polarizations are further and further divided into two to form $2^k$ kinds of optical path differences $L_1$ to $L_k$. Using the wavelength dispersion in the same way as the case of two kinds described in Equations (4) to (6), multi-wavelength oscillation condition can be satisfied as follows:

$$L_1(\lambda_1)=L_2(\lambda_2)=\ldots=L_m(\lambda_m) \quad (16)$$

where $2 \leq m \leq k$. If $\lambda_1 - \lambda_m$ is within the gain width of the gain medium, mode-lock oscillation for m-kinds of wavelengths can be obtained.

As described above, by using an optical path difference providing means 40 provided with more than one birefringent substance and arranged so that adjacent optical axis make an angle of substantially ±45°, many different optical path differences can be utilized. For example, birefringence at the light amplifying means 10 (birefringence of polarization preserving PANDA optical fiber, which may be used in embodiments shown in FIGS. 4 and 6 and of the laser diode chip in the embodiment of FIG. 5) or at the optical coupling fiber can be utilized. Depending on connection conditions with adjacent birefringent substances, different numbers of optical path differences can be reobtained.

Now, conditions under which the optical path difference providing means 40 described in FIGS. 7 to 9 effectively operate as a resonator are described below.

First consideration is for a resonator provided with two kinds of optical paths, using the first stage output shown in FIG. 9(b).

When $n_e > n_o$, the extraordinary ray $E_y$ corresponds to a long optical path $L_1$ and the ordinary ray $E_x$ to a short optical path $L_\leq$. To have these form a resonator, both the extraordinary ray $E_y$ and the ordinary ray $E_x$ need to receive the same gain (including loss) when they go around or go back and forth in the resonator and be input again in the polarization directions $E_y$ and $E_x$, which are the same as when output. If the extraordinary ray $E_y$ and ordinary ray $E_x$ are exchanged before re-input, then both of the polarized waves have the same optical path length as, $L_L + L_s$ when summing the first and the second travels, and this does not serve as a resonator for different optical path differences.

Specific conditions for re-input are:
(1) Both x and y polarized waves after output should be maintained as they are in the resonator and then input again, or
(2) Output x and y polarized waves should be cut by a linear polarized wave making an angle of ±45° with x axis and input them again keeping ±45° angle with the x axis.

The condition (1) applies only when the gain and the light modulation means do not depend on the polarization and the resonator can generate mode-lock oscillation with any polarized wave. While the condition (1) is free from any additional loss, the condition (2) is accompanied by a loss of dB in principle.

FIG. 10 is an explanatory view to describe how to configure a ring resonator which provides two kinds of optical path lengths under the condition (1). For easier understanding, the parts constituting the ring resonator are omitted and only the polarization state is expressed in the figure.

Figure 10A:
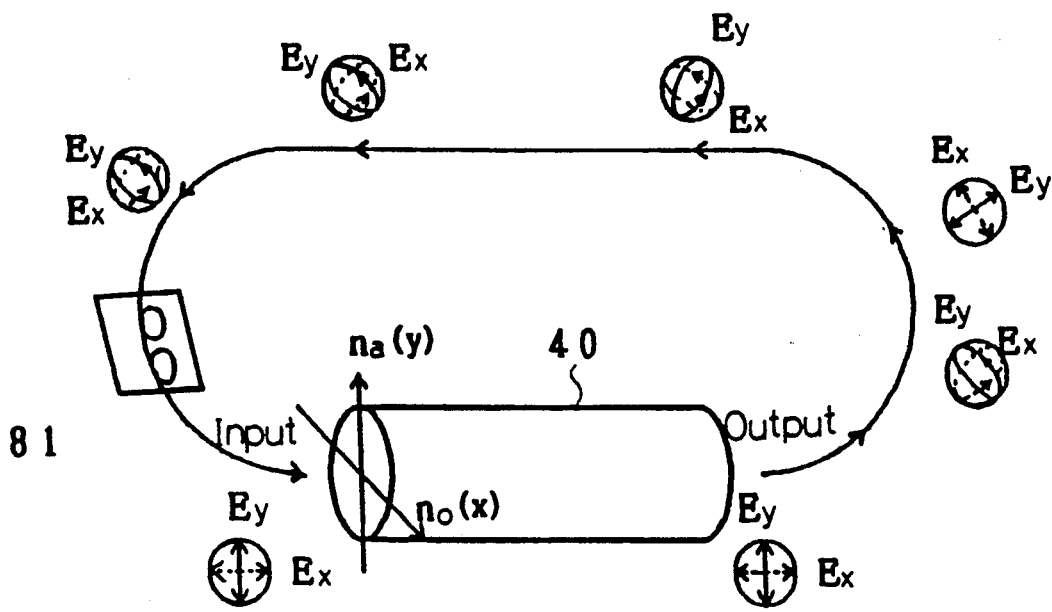
FIGS. 10(a) and 10(b) explain the configuration of a ring resonator to provide two optical path lengths.

FIG. 10(a) describes a case where substances without (or with very little) birefringence, such as ordinary circular core optical fibers are used except for the optical path difference providing means 40. If polarization is not maintained due to bend or for other reasons, the resonator is provided with a polarization controller (combination of ½ wavelength plate and ¼ wavelength plate) 81 to properly control the polarization for re-input.

Figure 10B:
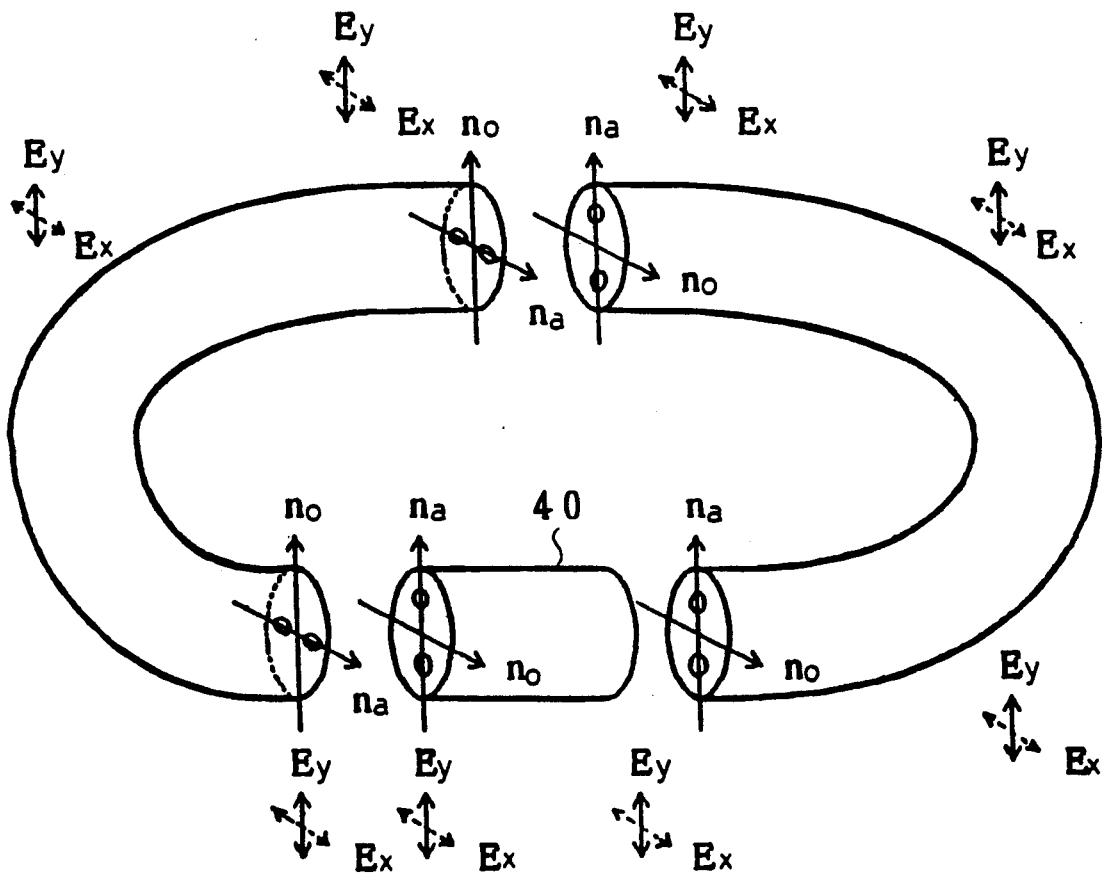

FIG. 10(b) shows a case where all components have the polarization preserving characteristics (polarization preserving PANDA optical fiber, for example). Both output and input ends of the optical path difference providing means 40 are provided with optical fibers keeping their principal axis (in directions of $N_e$ and $N_o$) in the direction of optic axis at both ends. In this case, however, an optical path difference is also added at the external polarization preserving PANDA optical fiber connected to the optical path difference providing means 40. Accordingly, it is necessary to design the resonator so that the external optical fiber is treated as a part of the optical path difference providing means or, as shown in FIG. 10(b), to make the difference at the external fiber equivalent to zero before use (by giving conditions to make the expression(9) zero with using two or more cross-spliced polarization preserving PANDA optical fibers having the same length at right angles for their fast axis).

The resonator shown in FIGS. 10(a) and (b) has two orthogonal cross-polarizations which coexist at any part. Its output optical pulse trains for two different wavelengths are always orthogonal. In addition, configurations shown in FIG. 10(a) and (b) can be combined. The configuration of FIGS. 10(a) and 10(b) can also be applied to a Fabry-Perot type resonator.

Figure 11:
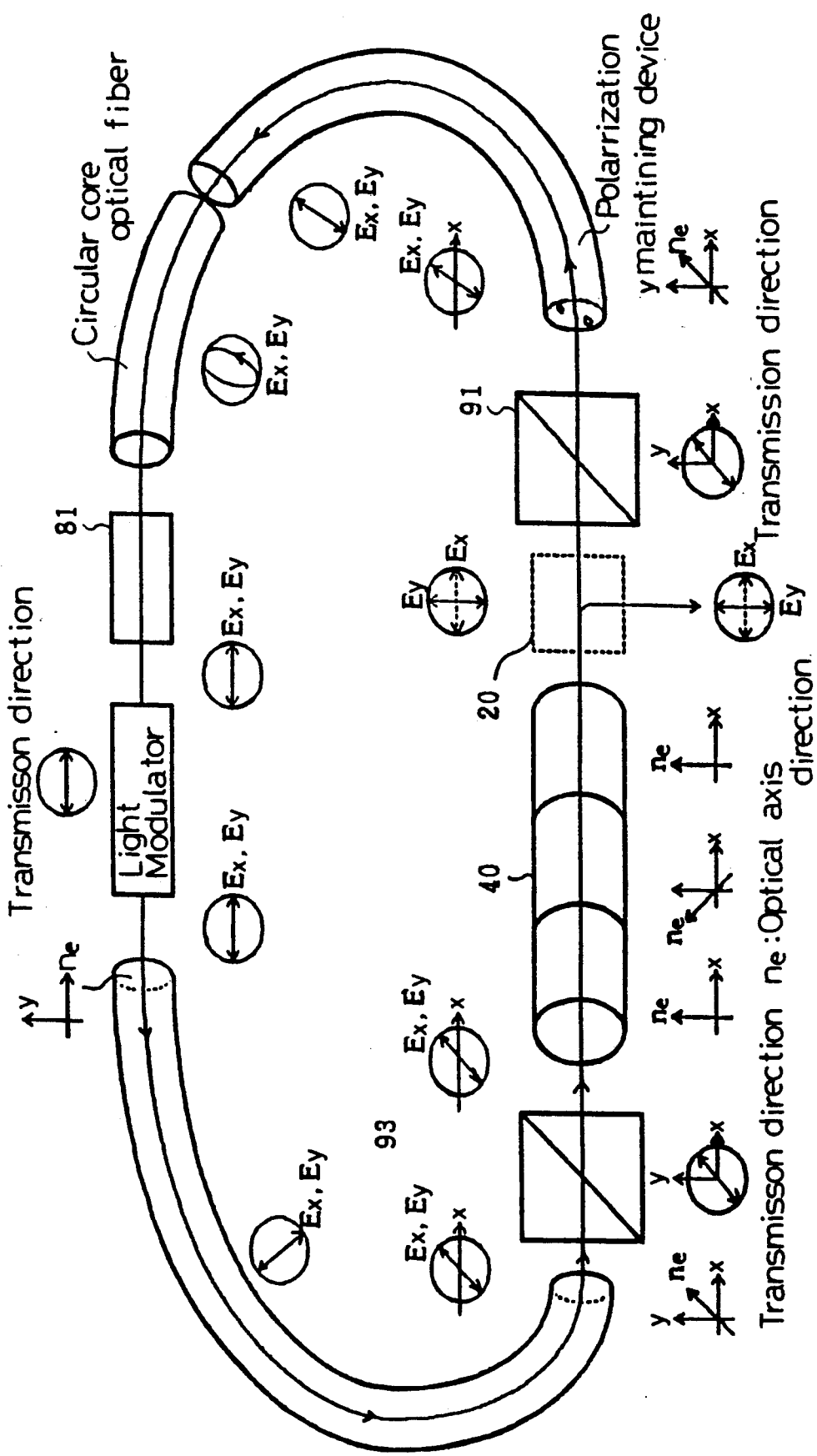
FIG. 11 shows a view to explain the configuration of a ring resonator to provide two or more optical path lengths.

FIG. 11 is an explanatory view to describe how to configure a ring resonator which provides two or more optical path lengths under the condition (2).

The condition (2) is an effective configuration for a resonator using polarization dependent parts (such as a LN modulator, laser diode amplifier, polarization dependent optical isolator and polarizer) which generates mode-lock oscillation for only one polarization, but this can also be applied to resonators without polarization dependency.

FIG. 11 shows the resonator arranged so that the two polarizations from the optical path difference providing means 40 injected to a first polarization dependent polarizer 91 make an angle of 45° with the principal axis of the polarizer 91. The linear polarization from the polarizer aligns with the principal axis of a second polarization dependent component and make an angle of 45° with the optic axis on the injection side when injected again to the optical path difference providing means 40. On the injection side of the optical path difference providing means 40, a polarizer 93 may be inserted for determining the injection condition of 45°. The resonator is provided with a polarization controller 81 for polarization control on the injection side of the light modulator.

In this configuration, two polarization states exist only between the optical path difference providing means 40 and the polarizer 91. If an optical branching device 20 is placed here, output of orthogonal cross polarizations can be obtained. If the optical branching device is placed at another position, then parallel polarizations will be output.

This configuration can also apply to a Fabry-Perot resonator, but if one of the polarizers is omitted, polarization-dependent components must be placed on the side with a polarizer.

Next, a resonator having three or more optical paths utilizing the output after the second stage shown in FIG. 9(b) is considered below.

FIG. 9(b) shows that the output of an optical path difference providing means consists of two orthogonal linear polarizations. Application to a ring resonator is first considered. Suppose the polarization direction $E_{yx'}$ output is rotated so that it becomes $E_y$ when input again from the opposite side. Here, $E_{yx'}$ can form a resonator because it has the same optical path length for the second time, but $E_{yy'}$ orthogonal to $E_{yx'}$ cannot form a resonator corresponding to $E_{yy'}$ because it has $E_x$ direction when input again. Similarly, $E_{xy}$ satisfies the resonance condition but $E_{xx'}$ does not. As a result, this configuration can have only two resonance conditions and cannot cause oscillation with three or more wavelengths.

To realize three or more wavelength resonances with a ring resonator, two polarizations output from the optical path difference providing means 40 need to be arranged to have polarization directions making angles of 45° with the optical axis on the input side of the optical path difference providing means 40 when they are input again from the opposite side. Thus, when a polarization component corresponding to an optical path difference has finished a cycle, its input polarization conditions are always the same as half of components and oscillation for three or more wavelengths can be realized.

Specifically, if components within the resonator are polarization dependent, the input/output stages of the optical path difference providing means 40 are provided with polarizers 91 and 93 as shown in FIG. 11. With this configuration, polarization is cut out by the polarizer 91 arranged to make a 45° angle with the output polarization at the output side of the optical path difference providing means 40 and led to the input side of the optical path difference providing means 40 as the linear polarization and returned as a linear polarization making an angle of 45° with the optical axis of the input side. If polarization states change on the way due because of circular core optical fibers or otherwise, a polarization controller 81 may be used as required to arrange the polarization to have any angle 45° on the input side. If a polarizer 93 is provided on the input side, it is not necessary to completely align the polarization.

If the components in the resonator are not polarization dependent as shown in FIG. 10, the polarization re-input to the optical path difference providing means 40 from the left side may be arranged to make an angle of 45°.

FIG. 12 shows another example of the optical path difference providing means. On this example plural wave guides which have physically different optical lengths are used instead of the different refractive indices. When lengths of the two waveguides are noted as $l_1$ and $l_2$ optical length of the resonator $L_1$ and $L_2$ is described as:

$$L_1(\lambda) = l_1 n(\lambda) + L_O n(\lambda) + L_c \quad (17)$$

$$L_2(\lambda) = l_2 n(\lambda) + L_O n(\lambda) + L_c \quad (18)$$

Where $L_O$ is the length of the refractive means for different wavelengths except the optical path difference providing means, $L_c$ is length other than the optical path difference providing means and the refractive means for different wavelengths. In this case the resonant condition is attained when $$L_1(\lambda_1) = L_2(\lambda_2) \quad (19)$$

When $L_1$ and $L_2$ are substituted into Eqs. (7) and (8), $$(L_O + l_1) n(\lambda_1) = (L_O + l_2) n(\lambda_2) \quad (20)$$

If $\lambda_1 - \lambda_2 = 1$ (nm), and if the optical fiber is employed, $$n(\lambda_1) - n(\lambda_2) = 1.2 \times 10^{-5}$$

then $$l_1 - l_2 = 1.2 \times 10^{-5} \times L_O / n(\lambda_1) \quad (21)$$

is attained. When the laser resonator is formed consisted of optical fiber, and the length of the fiber is 10 meters, that is $L_O$ is 10 meters, and the difference of $l_1$ and $l_2$ is calculated as 80 μm from the Eq (21). This is attained by a waveguide built on a semi-conductor device, on a dielectric device or on a quartz device.

If an optical path difference providing means with two or more stages is inserted to a Fabry-Perot type resonator, it should be inserted in the same way as the polarizers described above for the case with polarization-dependent components. If components other than the optical path difference providing means are not polarization dependent, it is sufficient to design so that the output polarization returns as it is and a polarization controller may be used if necessary.

As described above, this invention provides a new type of laser device, which generates a high-speed optical pulse train with many wavelengths having perfectly aligned repetitions, by adding an optical path difference providing means and hetero-wavelength optical path difference providing means and a hetero-wavelength optical path equalizing means to a mode-lock laser physically made of one resonator under certain conditions.

A wavelength division multiplex type mode-lock laser device according to this invention can serve as a multi-wavelength optical pulse light source or a wavelength division multiplex optical solution light source in frequency division optical transmission. In addition, a new optical measurement technique may be developed utilizing synchronized multi-wavelength oscillation and right-angle polarization oscillation, which is expected to be applied to wavelength dispersion measurement for optical fibers, pump-probe measurement to evaluate the dynamic characteristics of optical semiconductor devices, optical sampling measurement and other fields.

What is claimed is:

1. A wavelength division multiplex type mode-lock laser device comprising:
   a ring resonator type mode-lock laser device which includes:
   a) light modulating means to modulate an input optical signal based on a specified frequency (fr, k·fr),
   b) light amplifying means to amplify a modulated optical signal output from the modulating means,
   c) optical coupling means which optically couples said light modulating means, and said light amplifying means into a ring shape to form a ring resonator having a ring-shaped optical path of a specified length,
d) optical branching means, coupled in said ring resonator, for outputting an optical signal from the ring resonator,
e) an optical path difference providing means, coupled to said optical coupling means at a first location to receive a first optical signal therefrom, for providing different refractive indices for polarization directions orthogonal to each other of said first optical signal received from said optical coupling means, the resonator configured corresponding to optical path lengths formed according to the different refractive indices; and
f) hetero-wavelength optical path equalizing means, optically coupled to said first optical signal to provide different refractive indices for different wavelengths of the first optical signal.

2. A wavelength division multiplex type mode-lock laser device comprising
a Fabry-Perot type mode-lock laser device which includes:
a) a light modulating means to modulate an input optical signal based on a specified frequency (fr, k·fr),
b) a light amplifying means to amplify a modulated optical signal output from the modulating means,
c) two light reflectors, each of which reflects incident light thereon,
d) optical coupling means, coupling said two light reflecting means at ends of a series configuration, and optically coupling said light modulating means and said optical amplifying means between the two reflecting means, to form a Fabry-Perot type resonator having a round trip optical path of a specified length,
e) an optical path difference providing means coupled to said optical coupling means at a first location to receive a first optical signal therefrom, which provides different refractive indices for polarization directions of said first optical signal orthogonal to each other, to configure a resonator corresponding to the optical path lengths formed according to the refractive indices, and
f) a hetero-wavelength optical path equalizing means to provide different refractive indices for different wavelengths.

3. A wavelength division multiplex type mode-lock laser device according to either of claims 1 or 2 wherein a numerical relation $$L_1(\lambda_1)=L_2(\lambda_2)=\ldots L_m(\lambda_m)$$

is established, which is a condition that optical path lengths for different wavelengths are equalized by said hetero-wavelength optical path equalizing means,
where $L_1 \sim L_1$ (q is an integer more than one) are optical path lengths formed according to the refractive index,
$\lambda_1 \sim \lambda_m$ (where m is an integer more than one but not more than q) are wavelengths falling within the gain spectral width of the light amplifying means, and
$L_i(\lambda_j)$ is the optical path length i for the wavelength $\lambda_j$.

4. A wavelength division multiplex type mode-lock laser device according to claim 3, wherein said optical path difference providing means includes m resonators satisfying the interrelation $$L_1(1)=L_2(\lambda_2)=\ldots L_m(\lambda_m)$$

have among them larger wavelength differences than a spectral width of the optical pulse which is generated from the resonator.

5. A wavelength division multiplex type mode-lock laser device according to claim 3, wherein the wavelength $\lambda_1 \sim \lambda_m$ satisfying the interrelation $$L_1(1)=L_2(\lambda_2)=\ldots L_m(\lambda_m)$$

have among them larger wavelength differences than the spectral width of the optical pulse which is generated from the resonator.

6. A wavelength division multiplex type mode-lock laser device according to either of claims 1 or 2, wherein said optical path difference providing means accommodates at least one birefringent medium having one of a birefringent optical fiber or a birefringent crystal.

7. A wavelength division multiplex type mode-lock laser device according to either of claims 1 or 2, wherein said optical path difference providing means accommodates at least one of the birefringent media contained in the light amplifying means, heterowavelength optical path equalizing means or optical coupling means.

8. A wavelength division multiplex type mode-lock laser device according to claim 1, wherein said heterowavelength optical path equalizing means is a single mode optical fiber which shows zero dispersion at a certain wavelength and contains at least a part of the media having the wavelength dispersion characteristics contained in the optical coupling means, light amplifying means, optical branching means or optical path difference providing means.

9. A wavelength division multiplex type mode-lock laser device according to claim 2, wherein said heterowavelength optical path equalizing means is a single mode optical fiber which shows zero dispersion at a certain wavelength and contains at least a part of the media having the wavelength dispersion characteristic contained in the optical coupling means, light amplifying means or optical path difference providing means.

10. A laser device according to either of claims 1 or 2 wherein said light modulating means modulates said signal in amplitude with said specified frequency or modulates said input optical signal in phase with said specified frequency.

11. A mode lock laser device according to claim 1 wherein said light amplifying means comprises a first optical isolator for receiving light and transmitting said light only in a first direction;
a pumping light supplier, receiving said input light, for generating pumping light;
an optical fiber receiving the pumping light; and
a second optical isolator, downstream of said optical fiber, allowing light to flow only in the downstream direction.

12. A laser as in claim 11 wherein said pumping light supplying means is a semiconductor light source and a current source connected to supply current to the semiconductor light source.

13. A laser as in claim 12 wherein said pumping light source is a laser diode driven by a current source.

14. A laser as in claim 12 wherein said optical fiber is an optical fiber Raman amplifying unit.

* * * * *